(12) United States Patent
Domenjoud et al.

(10) Patent No.: US 11,007,460 B2
(45) Date of Patent: May 18, 2021

(54) DEVICE FOR TREATING AN EFFLUENT AND METHOD FOR TREATING AN EFFLUENT

(71) Applicant: SUEZ INTERNATIONAL, Paris la Défense (FR)

(72) Inventors: Bruno Domenjoud, Puteaux (FR); Gildas Manic, Chatou (FR)

(73) Assignee: SUEZ INTERNATIONAL, Paris la Défense (FR)

( * ) Notice: Subject to any disclaimer, the term of this patent is extended or adjusted under 35 U.S.C. 154(b) by 12 days.

(21) Appl. No.: 16/338,619

(22) PCT Filed: Oct. 11, 2017

(86) PCT No.: PCT/EP2017/075902
§ 371 (c)(1),
(2) Date: Apr. 1, 2019

(87) PCT Pub. No.: WO2018/073061
PCT Pub. Date: Apr. 26, 2018

(65) Prior Publication Data
US 2019/0232204 A1    Aug. 1, 2019

(30) Foreign Application Priority Data

Oct. 17, 2016    (FR) ...................................... 1660035

(51) Int. Cl.
*B01D 33/15*     (2006.01)
*B01D 33/06*     (2006.01)
(Continued)

(52) U.S. Cl.
CPC ........... *B01D 33/15* (2013.01); *B01D 21/267* (2013.01); *B01D 33/04* (2013.01); *B01D 33/06* (2013.01);
(Continued)

(58) Field of Classification Search
CPC ................................................... B01D 33/805
See application file for complete search history.

(56) References Cited

U.S. PATENT DOCUMENTS

| 5,021,166 | A | * | 6/1991 | Torpey | ................... | B01D 33/60 |
| | | | | | | 210/709 |
| 2009/0211992 | A1 | * | 8/2009 | Saho | ...................... | B01D 33/37 |
| | | | | | | 210/791 |
| 2014/0144836 | A1 | * | 5/2014 | Nyhuis | ................ | B01D 21/267 |
| | | | | | | 210/605 |

FOREIGN PATENT DOCUMENTS

| EP | 0 998 968 A2 | 5/2000 |
| JP | 2002-336609 A | 11/2002 |

(Continued)

*Primary Examiner* — Benjamin M Kurtz
(74) *Attorney, Agent, or Firm* — BakerHostetler

(57) ABSTRACT

A device for treating an effluent composed of liquid and of solid particles to obtain a treated effluent includes a filtration device using gravity separation on a rotating cloth having an inlet intended to receive the effluent to be treated and a first and a second outlet, the filtration device being designed to separate the effluent into a first flow and a second flow, the second flow comprising sludges comprising solid particles, the first flow leaving the filtration device through the first outlet, the second flow leaving the filtration device through the second outlet, and at least one recirculation device designed to recirculate at least a part of the sludges of the second flow to the inlet of the filtration device, the second outlet being linked to the at least one recirculation device. A method for treating an effluent is also provided.

5 Claims, 7 Drawing Sheets

(51) Int. Cl.
  *B01D 33/04* (2006.01)
  *C02F 1/00* (2006.01)
  *B01D 37/02* (2006.01)
  *B01D 21/26* (2006.01)
  *B01D 37/04* (2006.01)
  *B01D 33/80* (2006.01)
  *C02F 1/38* (2006.01)

(52) U.S. Cl.
  CPC .............. *B01D 37/02* (2013.01); *C02F 1/001* (2013.01); *C02F 1/004* (2013.01); *B01D 33/805* (2013.01); *B01D 37/041* (2013.01); *C02F 1/38* (2013.01); *C02F 2209/005* (2013.01); *C02F 2209/11* (2013.01); *C02F 2301/046* (2013.01)

(56) References Cited

FOREIGN PATENT DOCUMENTS

| | | |
|---|---|---|
| WO | 2012/136213 A1 | 10/2012 |
| WO | 2016/032344 A2 | 3/2016 |
| WO | 2016/107875 A1 | 7/2016 |

\* cited by examiner

DEVICE FOR TREATING AN EFFLUENT AND METHOD FOR TREATING AN EFFLUENT

CROSS-REFERENCE TO RELATED APPLICATIONS

This application is a National Stage of International patent application PCT/EP2017/075902, filed on Oct. 11, 2017, which claims priority to foreign French patent application No. FR 1660035, filed on Oct. 17, 2016, the disclosures of which are incorporated by reference in their entirety.

FIELD OF THE INVENTION

The invention lies in the field of the treatment of wastewater, for example of urban or industrial origin. The invention relates to a device for treating an effluent, for example wastewater. The invention relates also to a method for treating an effluent implementing such an effluent treatment device.

BACKGROUND

The purification of wastewater comprises several steps including a primary treatment step. The primary treatment has for a long time mostly used the physical principle of decantation to separate the solids from the treated water, and, sometimes, flotation for certain types of industrial waters. Recently, new separation techniques employing the physical principle of filtration have emerged on the market.

In particular, two filtration techniques are employed.

First of all, there is direct filtration on cloth. Filtration on cloth is performed on a cloth made of synthetic cloth composed of openings of a size less than or equal to approximately 55 µm. This type of filtration does not lie within the scope of the invention.

Then, there is also primary filtration by gravity separation on endless rotary cloth with cake formation. This filtration works on a cloth of rough mesh that can be between 90 and 800 µm on which there is formed a cake of accumulated solid, through which the filtration takes place. In other words, depending on the size of the particles in the water to be treated, some particles of small size pass through the meshes of the cloth and other particles, of larger size, are accumulated on the cloth. By being accumulated, the particles can form one or more additional layers on the cloth, that comes to be called cake.

The cloth is mounted on a rotation system. When the level of water to be treated becomes high, the cloth is rotated so that the part filled with sludge is cleaned, by scraping, by air blade and, if necessary, by pressurized water jets. A clean cloth is subsequently presented to the raw water to be filtered therein.

A part of the particulate pollution contained in the wastewaters offers a granule size distribution with a greater or lesser percentage of particles whose diameter is greater than or equal to 350 µm. Because of this, the first layer of solid forming the base of the cake is constructed very rapidly with coarse particles, in turn creating a new layer offering a much smaller water porosity than the first layer. The cake filtration system is capable of filtering to cutoff thresholds at less than 30 µm, for an initial cloth mesh of 350 µm.

Contrary to direct filtration offering a fairly brittle cloth, the filtration on cake uses a very strong coarse mesh, with solid fibers. The risk of tearing is minimal, despite exposure to a water matrix that can be highly abrasive. The result thereof is that it is necessary to have a fraction of particles of size greater than the mesh of the cloth to constitute the first cake layer.

Now, the granule size analysis of the particulate pollution can vary substantially from one wastewater to another and therefore, in some cases, be unfavorable in that it offers very few particles of a diameter greater than 350 µm. Because of this, a significant risk emerges of having a very low pollution elimination efficiency, the particles being too small to be retained on the cloth. They therefore pass through the system without being retained and without forming cake.

The granule size analysis of the wastewaters is a field with very little documentation, and it is difficult to know in advance and without prior operations, the effectiveness of the primary filtration. Because of this, the estimation of the efficiencies to be expected is fairly random, necessarily relying on available charts without any guarantee of corresponding to the reality in the field.

Moreover, the real efficiency of the machine is solely dependently on the quality of the raw water. The operator does not have the possibility of acting on the mechanism to increase or reduce the rate of capture of the particulate pollution.

One existing solution used to improve the effectiveness of the primary treatment is chemically preconditioning the wastewaters using a coagulation and flocculation step. This treatment makes it possible, on the one hand, to destabilize the fine colloid particles in the water, then to aggregate them using polymer in the form of flocs of a diameter of the order of a millimeter, allowing their filtration without problems on a 350 µm cloth. This technique, widely employed in the case of primary decantation, makes it possible to secure elimination efficiencies with very much higher values than would be expected from the separating techniques without conditioning. There are however many major drawbacks to this conditioning. Indeed, in the case of a primary filtration without the addition of reagents, the purifying performance levels are realized and uncontrolled in that they depend only on the characteristics of the particles present in the water to be treated. Furthermore, such a solution requires the arrangement of reaction vessels dedicated to the coagulation and the flocculation, with minimum dwell times to be observed and the equipment necessary to the stirring thereof. It is also necessary to provide additional equipment for the dosing of the reagents. Furthermore, the consumption of reagents can be significant since 5 to 15 mg of pure iron is necessary for each treated liter, as well as a polymer consumption of 1 to 2 mg per liter of treated water. The result of this is higher usage costs and longer filtration times. Finally, an excess production of primary mineral sludges can occur, an excess production which cannot be monetized in digestion, the sludges being stripped of any methane production capacity.

SUMMARY OF THE INVENTION

The invention aims to overcome all or some of the abovementioned problems by proposing a device for treating wastewaters that makes it possible to control the purifying efficiency of the primary filtration, without the addition of additional reagents, the efficiency then depending only on the granule size analysis of the pollution and on the chosen cloth mesh.

To this end, the subject of the invention is a device for treating an effluent composed of liquid and of solid particles to obtain a treated effluent, characterized in that it comprises:

a primary filtration device using gravity separation on a rotating cloth having an inlet designed to receive the effluent to be treated and a first and a second outlet, the filtration device being designed to separate the effluent into a first and a second flow, the first flow comprising the treated effluent, the second flow comprising sludges comprising solid particles, the first flow leaving the filtration device through the first outlet, at least one recirculation device designed to recirculate at least a part of the sludges of the second flow to the inlet of the filtration device, said second outlet being linked to the at least one recirculation device.

The technical effect of the recirculation device is to increase the quantity of particles in the effluent to be treated and the resulting advantage is to increase the quantity of particles of small size that can be retained on the rotating cloth. Thus, the method according to the invention offers the advantage of increasing and controlling the performance levels of the filtration while dispensing with the addition of additional reagents.

Advantageously, the filtration device comprises a first filter having a mesh of a first diameter designed to retain on the first filter the particles having a diameter greater than the first diameter.

Advantageously, the first filter is configured so as to form, in combination with the particles retained on the first filter, a second filter having a porosity corresponding to a cut-off threshold less than the first diameter. The technical effect of this configuration of the first filter is to allow the formation of the second filter corresponding to a filter having a mesh of diameter less than the first diameter in order to retain the smaller particles of the effluent to be treated.

Advantageously, the treatment device according to the invention can comprise a separation device configured to separate the particles of the second flow according to their size or their density, so as to recirculate to the inlet of the filtration device the particles of size or density greater than a predefined size or density.

Advantageously, the separation device comprises a hydrocyclone. The technical advantage of the hydrocyclone is to be able separate by centrifugal force the heavy particles from a liquid and propose a separation with a very good efficiency.

Advantageously, the treatment device comprises a device for diluting the second flow positioned downstream of the second outlet of the filtration device. The dilution device has the technical effect of facilitating the segregation of the particles of large density or size and allows for a pre-dilution of the waters before passage through the separation device. The dilution will be controlled relative to the quality of the sludges produced and will be done by taking back a fraction of the raw water (by pumping or gravity) placed in contact with all or part of the sludges produced, this contact being made by static or mechanical mixer.

Advantageously, the treatment device further comprises a device for seeding the effluent, positioned upstream of the inlet of the filtration device and designed to seed particles of diameter greater than a previously defined second diameter so as to increase the quantity of particles in the effluent that can contribute to the formation of the second filter. The seeding device offers the advantage of increasing the quantity of particles of small size that can be retained by the first and second filters.

According to another embodiment, the treatment device comprises a turbidity probe positioned upstream of the inlet of the filtration device capable of supplying a measurement of turbidity of the effluent, a turbidity probe positioned downstream of the first outlet of the filtration device capable of supplying a measurement of turbidity of the first flow, an activation pump for the separation device, and a means for servocontrolling the activation pump of the separation device as a function of the measurement of turbidity of the first flow and/or of a difference between the measurement of turbidity of the first flow and the measurement of turbidity of the effluent. The presence of the probes and of the servocontrolling means has the effect of allowing for a servocontrolling of the activation pump of the separation device as a function of the measurements performed by the probes. The result thereof is a better control of the effluent treatment device as a function of the desired treatment level.

Advantageously, the treatment device comprises a computer designed to compute a treatment performance as a function of the measurement of turbidity of the first flow and the measurement of turbidity of the effluent, and the servocontrolling means is configured to activate the activation pump when the treatment performance reaches a first predefined threshold value and to deactivate the activation pump when the treatment performance reaches a second predefined threshold value. The effect of the computer is to determine a treatment performance. The advantage which results therefrom is to be able to servocontrol the activation pump as a function of the treatment performance obtained and of predefined threshold values.

The invention relates also to a method for treating an effluent composed of liquid and of solid particles to produce a treated effluent implementing a primary filtration device using gravity separation on a rotating cloth having an inlet designed to receive the effluent to be treated and a first and a second outlet, the method comprising a step of separation of the effluent into first and second flows, the first flow comprising the treated effluent, the second flow comprising sludges comprising solid particles, the first flow leaving the primary filtration device through the first outlet and the second flow leaving the filtration device through the second outlet, and a step of recirculation of at least a part of the sludges of the second flow to the inlet of the filtration device by a recirculation device.

Advantageously, the treatment method according to the invention implementing a primary filtration device using gravity separation on a rotating cloth having an inlet designed to receive the effluent to be treated and a first and a second outlet, the filtration device comprising a first filter having a mesh of a first diameter designed to retain on the first filter the particles having a diameter greater than the first diameter comprises a step of formation of a second filter from the first filter and the particles retained on the first filter, the second filter having a mesh corresponding to a second diameter less than the first diameter.

Advantageously, the treatment method according to the invention further comprises a step of separation of the particles of the second flow as a function of their size or density by a separation device, so as to recirculate to the inlet of the filtration device the particles of size or density greater than a predefined size or density.

Advantageously, the treatment method comprises a step of dilution of the second flow downstream of the second outlet of the filtration device.

Advantageously, the treatment method comprises a step of seeding of the effluent upstream of the filtration device with particles of diameter greater than a previously defined second diameter so as to increase the quantity of particles in the effluent that can contribute to the formation of the second filter.

Advantageously, the treatment method comprises a step of measurement of turbidity of the effluent by a turbidity probe positioned upstream of the inlet of the primary filtration device, a step of measurement of turbidity of the first flow by a turbidity probe positioned downstream of the first outlet of the primary filtration device, a step of activation, of intensity modulation or of deactivation of the separation device by an activation pump, and a step of servocontrolling of the activation pump of the separation device as a function of the measurement of turbidity of the first flow and/or of a difference between the measurement of the turbidity of the first flow and the measurement of turbidity of the effluent.

Furthermore, the treatment method can comprise a step of computation by a computer of a treatment performance as a function of the measurement of turbidity of the first flow and the measurement of turbidity of the effluent, in which case the step of servocontrolling of the activation pump consists in activating or increasing the frequency of the variable frequency drive of the activation pump when the treatment performance reaches a first predefined threshold value and in deactivating or reducing the frequency of the variable frequency drive of the activation pump when the treatment performance reaches a second threshold value.

BRIEF DESCRIPTION OF THE DRAWINGS

The invention will be better understood and other advantages will become apparent on reading the detailed description of an embodiment given by way of example, a description illustrated by the attached drawing in which.

For clarity, the same elements will bear the same references in the different figures.

DETAILED DESCRIPTION

In the description, the invention is described with the example of an effluent such as wastewater. However, the invention is applicable to any other liquid containing particles.

Figure 1:
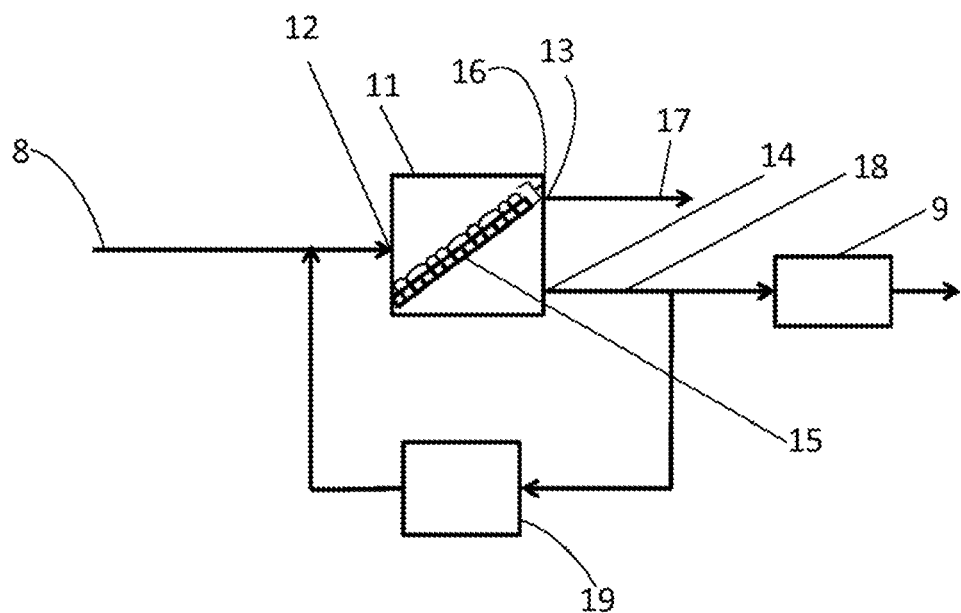
FIG. 1 schematically represents a first embodiment of an effluent treatment device according to the invention, FIG. 2 schematically represents a second embodiment of an effluent treatment device according to the invention, FIG. 3 schematically represents a third embodiment of an effluent treatment device according to the invention, FIG. 4 schematically represents a fourth embodiment of an effluent treatment device according to the invention, FIG. 5 schematically represents a fifth embodiment of an effluent treatment device according to the invention, FIG. 6 schematically represents the steps of the effluent treatment method according to the invention.

FIG. 1 schematically represents a first embodiment of a device 10 for treating an effluent 8 to produce a treated effluent according to the invention. Generally, it is considered that the effluent 8 is composed of liquid and of solid particles, the solid particles being understood to be solid particles that can be rigid and/or more or less soft. According to the invention, the treatment device 10 comprises a primary filtration device 11 using gravity separation on rotating cloth having an inlet 12 designed to receive the effluent 8 to be treated and a first 13 and a second 14 outlet, the filtration device 10 being designed to separate the effluent 8 into a first 17 and a second 18 flow, the first flow 17 comprising the treated effluent, the second flow 18 comprising sludges comprising solid particles, the first flow 17 leaving the filtration device 11 through the first outlet 13 and the second flow 18 leaving the filtration device 11 through the second outlet 14. The treatment device 10 comprises at least one recirculation device 19 designed to recirculate at least a part of the sludges of the second flow 18 to the inlet 12 of the filtration device 11, said second outlet being linked to the at least one recirculation device 19. The recirculation of a part of the sludges of the second flow 18 makes it possible to increase the quantity of particles in the effluent 8 that can be retained on the rotating cloth.

The filtration device 10 can comprise a first filter 15 having a mesh of a first diameter designed to retain on the first filter 15 the particles having a diameter greater than the first diameter.

The first filter 15 can be configured so as to form, in combination with the particles retained on the first filter 15, a second filter 16 having a mesh having a porosity corresponding to a cut-off threshold less than the first diameter.

The first diameter of the mesh of the first filter 15, that is to say the mesh size of the rotating cloth, is generally 350 µm. Depending on the granule size analysis of the effluent to be treated, it is possible to prefer a smaller first diameter, for example 100 or 200 µm if it is known that the effluent essentially contains particles of small sizes, or else a larger first diameter, for example 400 or 450 µm or above if it is known beforehand that the particles of the effluent are of very large sizes.

As previously explained, in the wastewaters to be treated, it is known that a part of the particles are of a diameter greater than the selected first diameter. Thus, these particles having a diameter greater than the first diameter will accumulate on the first filter 15. These particles, in combination with the first filter, then form a second filter 16. The result thereof is that the second filter 16 has a porosity (that can be seen as a mesh size) corresponding to a cut-off threshold less than the first diameter since other particles are overlaid on the meshes of the first filter 15. The porosity to the effluent therefore becomes much lower with the second filter 16 than with only the first filter 15. This is what is called cake filtration. Nevertheless, it may be that the effluent contains few particles of a diameter greater than the first diameter. The second filter 16 can then be difficult to form, penalizing the filtration of the effluent. In order to counter this problem, the invention ensures the formation of the second filter whatever the granule size analysis of the effluent. The principle of the invention relies on the recirculation of at least a part of the sludges, normally directed to a sludge treatment unit 9, to the inlet 12 of the filtration device 11. In other words, in order to ensure a good filtration of the effluent 8, that is to say an effective separation of the particles of the effluent 8, the treatment device according to the invention aims to insert particles into the effluent 8, that is to say seeks to increase the quantity of particles in the effluent 8 to be treated.

Figure 2:
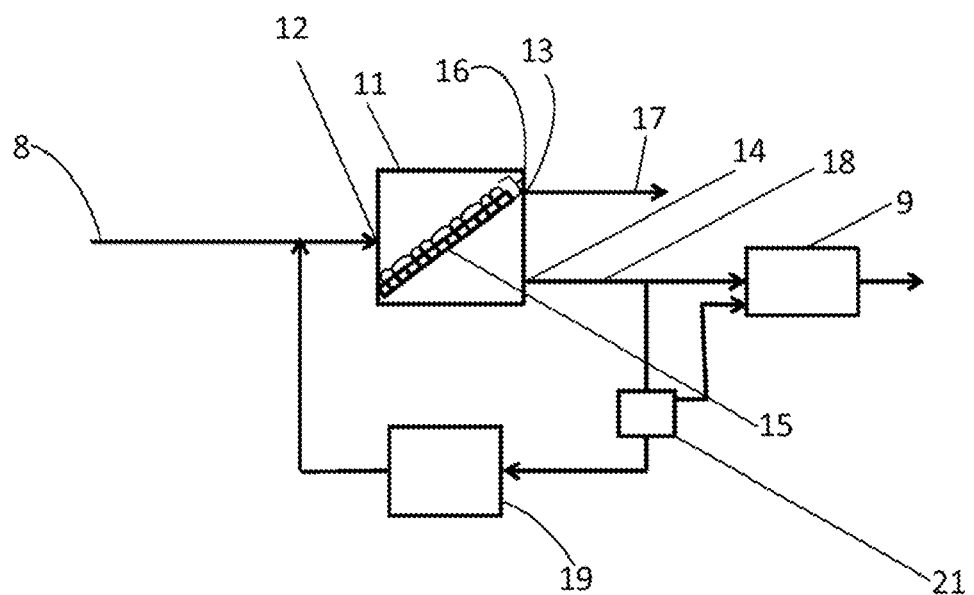

FIG. 2 schematically represents a second embodiment of a device 20 for treating an effluent according to the invention. The treatment device 20 represented in FIG. 2 comprises the same elements as the treatment device 10 represented in FIG. 1. In the second embodiment, the treatment device 20 further comprises a separation device 21 configured to separate the particles from the sludges of the second flow 18 as a function of their size or density, so as to recirculate to the inlet 12 of the filtration device 11 the particles of size or density greater than a predefined size or density. The particles of size or density less than the predefined size or density can be directed to the sludge treatment unit 9. The predefined size or density can be chosen according to the type of effluent to be treated and/or according to the purifying efficiency obtained and/or according to the quality of the water treated. Thus, if it is found that the first flow 17 still contains too many particles, and therefore that the filtration device 11 is not adequately filtering the effluent 8, the predefined size or density can be reduced thus recirculating the particles to the inlet 12 of the particles which would have hitherto been directed to the treatment unit 9 in order to guarantee the good formation of the filter 16. Also, the rate of recirculation can be adapted to recirculate more particles in order to ensure the formation of the second filter 16 which makes it possible to treat the effluent adequately, that is to say for the first flow 17 not to comprise too many particles.

Figure 3:
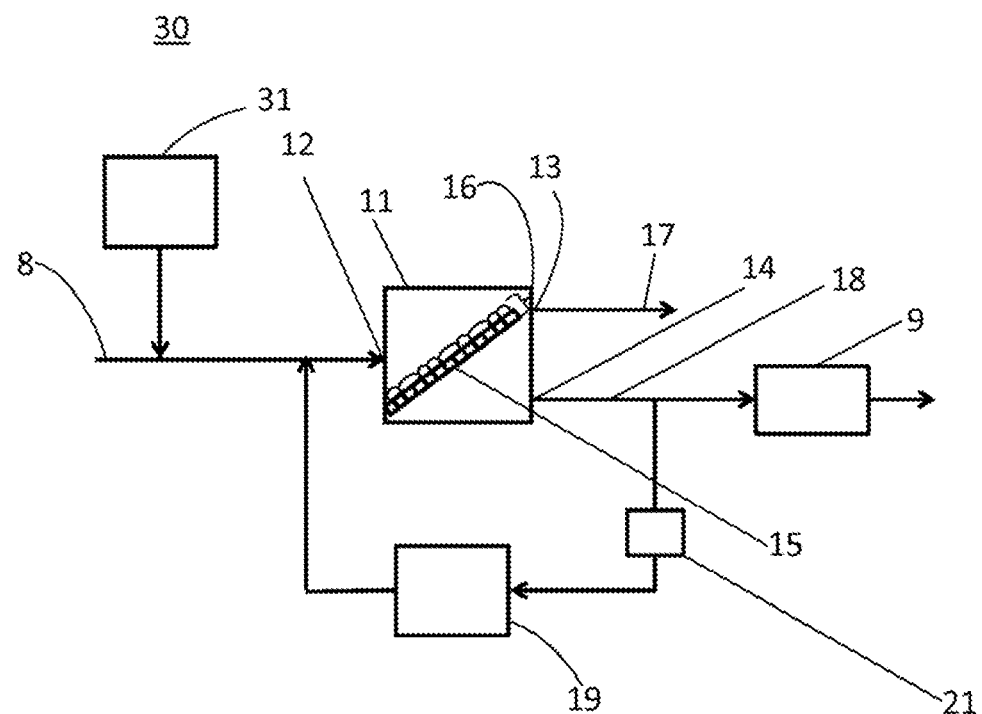

FIG. 3 schematically represents a third embodiment of a device 30 for treating an effluent according to the invention. The treatment device 30 represented in FIG. 3 comprises the same elements as the treatment device 20 represented in FIG. 2. According to the invention, the treatment device 30 can further comprise a seeding device 31 for the effluent 8 positioned upstream of the inlet 12 of the filtration device 11 and designed to seed particles of diameter and density greater than a second diameter and a density that are previously defined so as to increase the quantity of particles in the effluent 8 that can contribute to the formation of the second filter 16. This embodiment is particularly advantageous in the case where the effluent is without or is low in particles of diameter greater than the first diameter, for example 350 μm. The seeding device 31 thus adds to the effluent 8 particles of large diameter, greater than the first diameter. This is an artificial doping of the effluent 8 by the addition of particles with an appropriate granule size analysis. These particles seeded into the effluent 8 then accumulate on the first filter 15 and contribute to the formation of the second filter 16. In other words, these seeded particles are intended to form layers of the filtration cake.

In this embodiment, it is preferable to activate the separation device 21 continuously to ensure that the seeded particles are contained in the treatment device and avoid their loss to the sludge treatment unit 9. In other words, in the case of a seeding, it is preferable for the second flow 18 to be directed to the separation device 21 to keep the particles in the treatment device. And, without seeding, the second flow 18 can be directed to the sludge treatment unit 9 and/or the separation device 21. The proportion of the second flow 18, and therefore the proportion of sludges, directed to the separation device 21, is a lever that can be adapted according to the desired treatment level.

The particles used for the seeding can be recovered in the second flow 18, recirculated to the separation device 21 and reinjected to the effluent 8 to be treated.

Figure 4:
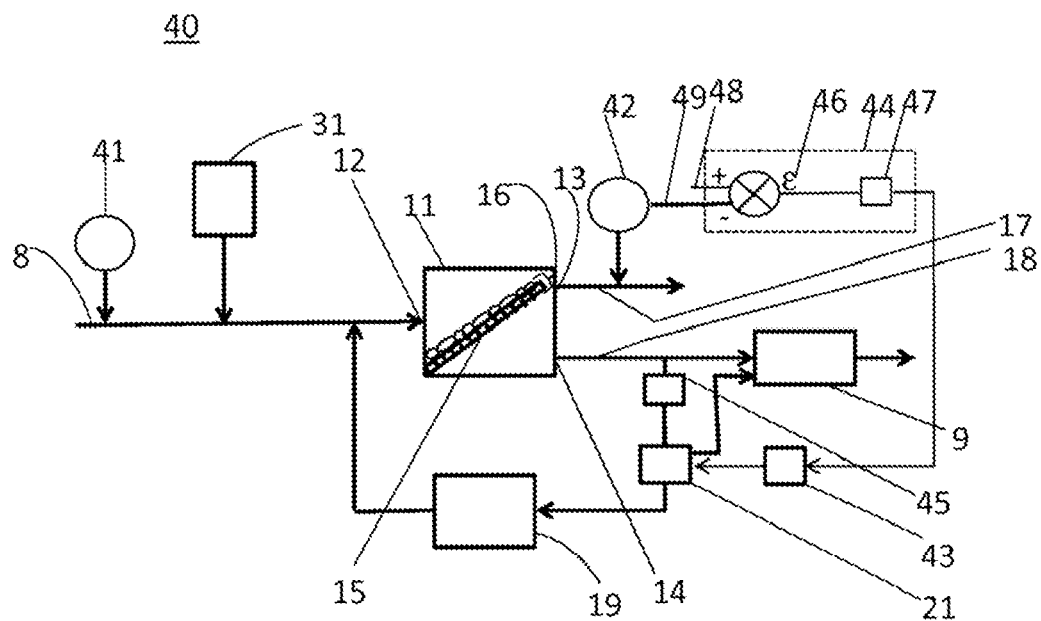

FIG. 4 schematically represents a fourth embodiment of a device 40 for treating an effluent according to the invention. The treatment device 40 represented in FIG. 4 comprises the same elements as the treatment device 30 represented in FIG. 3. It can be noted in passing that the treatment device 40 could not include the seeding device 31. In this fourth embodiment, the device 40 for treating an effluent 8 advantageously comprises a turbidity probe 41 positioned upstream of the inlet 12 of the filtration device 11 capable of supplying a measurement of turbidity of the effluent 8, a turbidity probe 42 positioned downstream of the first outlet 13 of the filtration device 11 capable of supplying a measurement of turbidity 49 of the first flow 17, an activation pump 43 for the separation device 21, a means 44 for servocontrolling the activation pump 43 for the recirculation device 19 as a function of the measurement of turbidity 49 of the first flow 17 and/or of the measurement of turbidity 49 of the effluent 8 and/or of a difference between the measurement of turbidity 49 of the first flow 17 and the measurement of turbidity of the effluent 8.

The inlet 41 and outlet 42 turbidity probes make it possible in real time to known the quality of the effluent 8 to be treated as well as the effective elimination efficient of the treatment device according to the invention. An operator in charge of the treatment device can decide to set an operating point of the treatment device. This operating point can be in the form of an outlet turbidity setpoint 48, or an inlet turbidity setpoint, or an efficiency to be reached by measuring the difference in measurements supplied by the two probes 41, 42. If the effective turbidity value 49 is higher or lower, depending, then the setpoint 48 set by the operator, or if the turbidity efficiency is lower than the setpoint, a difference 46 is determined and the activation pump 43 is started up and remains in operation as long as the set setpoint 48 is not reached, that is to say as long as difference 46 is non-zero, or as long as it is above a threshold value.

This, here, is an example of regulation of the treatment device. Other regulation algorithms can be envisaged according to different measurements at the inlet and outlet of the treatment device to allow for an effective servocontrolling of the treatment device. In other words, the invention relates to any treatment device with a means 44 for servocontrolling the activation pump 43 of the separation device 21 as a function of the inlet and/or outlet measurements.

The sludge is sent to the separation device 21. As already mentioned, the separation device 21 directs the particles of size greater than the predefined size to the inlet 12 of the filtration device 11 and to the sludge treatment unit 9, the particles of size less than the predefined size.

If the setpoint 48 set by the operator is reached, the granule size analysis of the effluent 8 makes it possible to reach the desired performance levels, it is then no longer necessary to dope the effluent with particles of large size, and the activation pump 43 of the separation device 21 is stopped.

Furthermore, the treatment device 40 can comprise a computer 47 designed to compute a treatment performance level as a function of the measurement of turbidity 49 of the first flow 17 and the measurement of turbidity of the effluent 8, and the servocontrolling means 44 can be configured to activate the activation pump 43 when the treatment performance reaches a first predefined threshold value and to deactivate the activation pump 43 when the treatment performance reaches a second predefined threshold value. For example, the treatment performance can correspond to the ratio between the measurement of turbidity 49 of the first flow 17 and the measurement of turbidity of the effluent 8 or else a difference between these two measurements. It is also possible, for a treatment performance lying between the first and the second threshold values, to adapt the flow rate as a function according to the result desired. In other words, the flow rate can be adapted as required in the operation of the treatment device as a function of the measurements performed.

The computer 47 can be incorporated in the servocontrolling means 44 as represented in FIG. 4, but it can also be external to the servocontrolling means 44.

Moreover, the activation pump 43 can be equipped with a variable speed drive, for example to adapt the frequency of an electric motor to switch from a mode of operation by activation and deactivation to a continuous mode of operation with modulation of the flow rate as a function of the differences 46 from the turbidity setpoints 48 set. This continuous mode of operation makes it possible to avoid untimely motor startups and stoppages which risk damaging parts and/or limiting the life thereof.

Advantageously, the treatment device 40 according to the invention can comprise a device 45 for diluting the second flow 18 positioned downstream of the second outlet 14 of the filtration device 11. The dilution device 45, designed to facilitate the segregation of the particles of significant density or size, can use the treated water of the first flow 17 or else the water of the industrial water circuit in which the treatment device is installed, or even potable water. The device 45 for diluting the second flow 18 allows for a predilution of the waters before passage through the separation device 21, particularly if the sludges are too thick at the outlet 14 of the filtration device 11.

Figure 5:
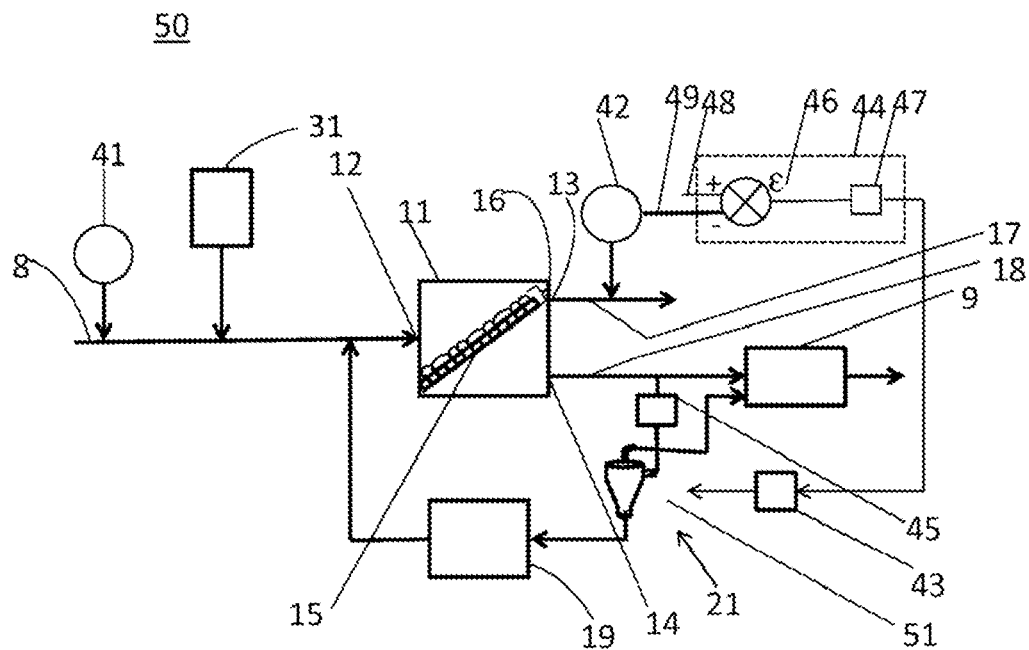

FIG. 5 schematically represents a fifth embodiment of a device 50 for treating an effluent according to the invention. The treatment device 50 represented in FIG. 5 comprises the same elements as the treatment device 40 represented in FIG. 4. It can also be noted here that the treatment device 50 could not include the seeding device 31. According to the invention, the separation device 21 can comprise a hydrocyclone 51. The hydrocyclone 51 is a device which uses centrifugal force to separate the heavy particles of a liquid. In FIG. 5, the second flow 18 enters through from the right of the hydrocyclone 51, the heavy particles leave through the bottom of the hydrocyclone and are directed to the inlet 12 of the filtration device 11 and the part containing the light particles leaves through the top of the hydrocyclone 51 and is directed to the sludge treatment unit 9. The separation efficiencies of the hydrocyclones between light and heavy particles are directly dependent on the manner in which the unit is dimensioned. The literature indicates efficiencies greater than 97% for units correctly designed and operated.

As an alternative to the hydrocyclone 51, the separation device 21 can comprise a sieve allowing for a screening of the sludges, corresponding to a separation of the fine particles and of the particles of larger size. It is also possible to use, as an alternative to the hydrocyclone 51, a decantation device making it possible to obtain the separation of the fine particles and of the particles of larger size by decantation.

For ease of understanding, the invention is described with a recirculation device 19. The invention relates also to any treatment device comprising two, three, or a plurality of recirculation devices. In this case, the second outlet 14 of the primary filtration device 11 is linked to the two, three, or the plurality of recirculation devices.

Figure 6:
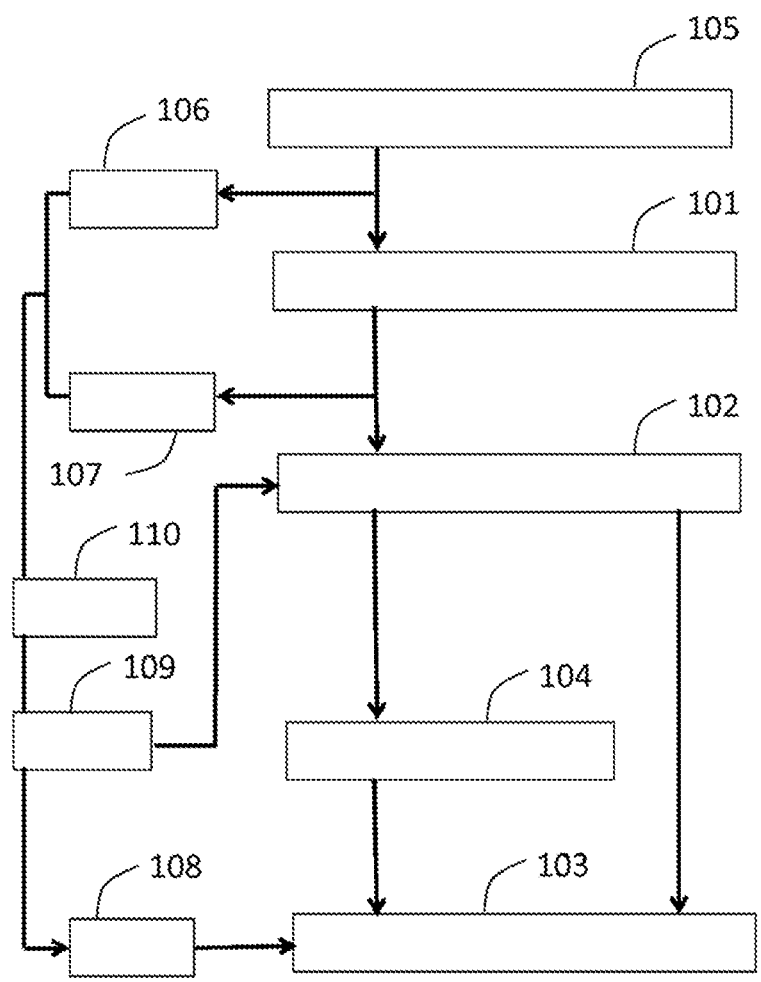

FIG. 6 schematically represents the steps of the method for treating an effluent according to the invention. The method for treating an effluent 8 to be treated composed of liquid and of solid particles implementing a primary filtration device 11 using gravity separation on rotating cloth having an inlet 12 designed to receive the effluent 8 to be treated and a first 13 and a second 14 outlet, comprises a step 101 of separation of the effluent 8 into first 17 and second 18 flows, the first flow 17 comprising the treated effluent, the second flow 18 comprising sludges comprising solid particles, the first flow 17 leaving the filtration device 11 through the first outlet 13 and the second flow 18 leaving the filtration device 11 through the second outlet 14. The method comprises a step of recirculation 102 of at least a part of the sludges of the second flow 18 to the inlet 12 of the filtration device 11 by a recirculation device 21 so as to increase the quantity of particles in the effluent that can be retained on the rotating cloth.

Advantageously, the treatment method according to the invention implements the primary filtration device 11 further comprising a first filter 15 having a mesh of a first diameter designed to retain on the first filter 15 the particles having a diameter greater than the first diameter and comprises a step of formation of a second filter 16 from the first filter 15 and from the particles retained on the first filter 15, the second filter 16 having a porosity corresponding to a cut-off threshold less than the first diameter.

Advantageously, the treatment method further comprises a step of separation 103 of the particles of the second flow 18 as a function of their size or their density by a separation device 21, so as to recirculate to the inlet 12 of the filtration device 11 the particles of size or density greater than a predefined size or density. It is possible to direct to the sludge treatment unit 9 the particles of size or density less than the predefined size or density.

By recirculating a part of the particles, preferably of large diameter, the method according to the invention secures the formation of the second filter 16, that is to say the formation of the cake allowing for a better filtration on the rotating cloth and guaranteeing a good purifying efficiency.

The treatment method according to the invention can comprise a step of dilution 104 of the second flow 18 downstream of the second outlet 14 of the filtration device 11 to facilitate the segregation. The dilution step 104 is important above all if the sludges are too thick at the outlet 14 of the filtration device 11.

In another embodiment, the treatment method according to the invention comprises a step of seeding 105 of the effluent 8 upstream of the filtration device 11 with particles of diameter greater than a previously defined second diameter so as to increase the quantity of particles in the effluent that can contribute to the formation of the second filter. This embodiment is particularly advantageous in the case where the effluent 8 is too low in particles of diameter greater than the first diameter. The seeding step 105 makes it possible to add to the effluent 8 particles of large diameter, greater than the first diameter.

In a particularly advantageous embodiment, the treatment method comprises a step of measurement 106 of turbidity of the effluent 8 by a turbidity probe 41 positioned upstream of the inlet 12 of the primary filtration device 11, a step of measurement 107 of turbidity 49 of the first flow 17 by a turbidity probe 42 positioned downstream of the first outlet 13 of the primary filtration device 11, a step of activation, of intensity modulation or of deactivation 108 of the separation device 21 by an activation pump 43, a step of servocontrolling 109 of the activation pump 43 of the separation device 21 as a function of the measurement of turbidity 49 of the first flow 17 and/or of a difference between the measurement of turbidity 49 of the first flow 17 and the measurement of turbidity of the effluent 8.

In association with the step of measurement 107 of turbidity 49 of the first flow 17, the treatment method according to the invention can comprise, in the recirculation step 102, a step of modulation of the flow rate of the flow recirculated when the first flow 17 comprises too many particles relative to the desired treatment level.

The treatment method can in particular comprise a step of computation 110 by a computer 47 of a treatment quotient corresponding to the ratio between the measurement of turbidity 49 of the first flow 17 and the measurement of turbidity of the effluent 8, and the step of servocontrolling 109 of the activation pump 43 then consists in activating the activation pump 43 or increasing the frequency of the variable frequency drive of the activation pump 43 when the treatment quotient is above a predefined threshold value and in deactivating the activation pump 43 or reducing the frequency of the variable frequency drive of the activation pump 43 when the treatment quotient is below a threshold value. The computation step 110 and the servocontrolling step 109 are a means of acting on the control of efficiency.

The purifying performance levels of such a method are secured since even an effluent low in particles of sizes greater than the first diameter can be treated by recycling of its largest size particles. The method according to the invention offers the possibility of controlling the efficiency of the treatment of the effluent. In effect, if high purifying efficiency levels are required, the operator can choose to recycle a significant proportion of particles of large diameter, allowing the formation of a suitable cake. Furthermore, the operator can control this recirculation of particles. The servocontrolling controls the recirculation. Finally, the invention proposes a solution without chemical inputs: no additional sludge is produced, and no need for reagents which have a negative impact on costs and the environment.

Figure 7:
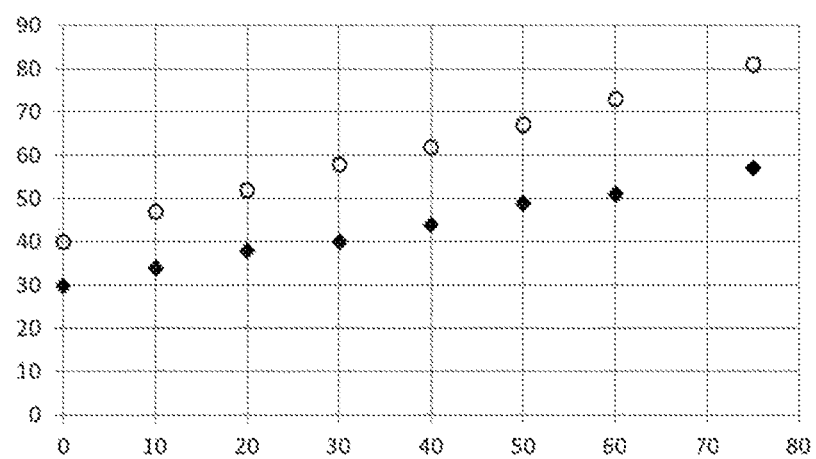
FIG. 7 illustrates the results of a modeling of the recirculation of all or part of the sludges produced on the overall efficiency of elimination of the solids in suspension in the effluent.

FIG. 7 illustrates the results of a modeling of the recirculation of all or part of the sludges produced, by a treatment device according to the invention, on the overall efficiency of elimination of the solids in suspension (also called MES as the acronym thereof) in the effluent. The graph of FIG. 7 represents the efficiency of elimination of the solids in suspension (MES) as a percentage (y axis) as a function of the fill of solids in suspension recirculated to the total incoming fill of solids in suspension (MES) as a percentage (x axis) for two wastewaters. The model used was developed from experimental data. It was applied to two wastewaters of equivalent qualities but of different filterabilities.

Assumptions and limiting conditions
Municipal wastewaters screened, cleaned and degreased.
Solids in suspension in the effluent: 300 mg/l
Unit fill of MES: 30 kg/h
Temperature: >8° C.
pH: 6-8
Rate of capture of the MES without recirculation:
  Wastewater 1: $\Delta$MES=40% (symbol in circle on the graph)
  Wastewater 2: $\Delta$MES=30% (symbol in rhombus on the graph)

FIG. 7 presents the effect of the increase of the percentage of solids in suspension (MES) of the raw effluent recirculated from the primary sludges produced on the overall efficiency of elimination of the solids in suspension (MES). The rate of capture of the solids in suspension (MES) is calculated from the concentrations of solids in suspension (MES) in the raw effluent before recirculation.

When 0% of the sludges produced are recirculated, the rate of capture of the MES for the wastewaters 1 and 2 are respectively 30 and 40%. This shows that the particles or MES contained in the wastewater 1 lead to the formation of a cake having a greater filtration potential than those of the wastewater 2.

In both cases, wastewater 1 and wastewater 2, the recirculation of the primary sludges leads to the improvement of the overall rate of capture of the solids in suspension by the filtration unit. An improvement is observed whatever the rate of recirculation of the primary sludges between 0% and 100%.

For one and the same percentage fill of recirculated MES, the increase in the rate of capture is greater in the case of the wastewater 1, which is consistent with the greater potential of the MES of the wastewater 1 to form a filtering cake on the surface of the cloth.

As an example, to maintain a rate of capture of the MES greater than 50%, it will be necessary in the case of the wastewater 1 to recirculate the equivalent of at least 20% of the incoming charge whereas, for the wastewater 2, the recirculation of the equivalent of 60% of the incoming charge will be necessary.

The results show that it is therefore possible to control the rate of capture of the MES by the treatment device according to the invention comprising the primary filtration unit with recirculation of all or part of the sludges produced.

Thus, the method according to the invention offers the advantage of increasing and of the filtration performance levels without involving additional reagents. It is important to stress that the invention relies on the fact that the sludge itself constitutes the filter. There is no addition of external matter into the effluent. In other words, the filtering material is directly derived from the effluent to be treated, and the invention does not require the addition of an additional medium.

The invention claimed is:

1. A device for treating an effluent composed of liquid and of solid particles to obtain a treated effluent, comprising:
   a primary filtration device using gravity separation on a rotating cloth having an inlet designed to receive the effluent to be treated and a first and a second outlet, the primary filtration device being designed to separate the effluent into a first flow and a second flow, the first flow comprising the treated effluent, the second flow comprising sludges comprising solid particles, the first flow leaving the primary filtration device through the first outlet and the second flow leaving the primary filtration device through the second outlet, at least one recirculation device designed to recirculate at least a part of the sludges of the second flow, onfigured to be directed toward a treatment unit, to the inlet of the primary filtration device, said second outlet being linked to the at least one recirculation device;
   a separation device configured to separate particles from the sludges of the second flow according to their size or their density, so as to recirculate to the inlet of the primary filtration device particles of a size greater than a predefined size or density;
   a turbidity probe positioned upstream of the inlet of the primary filtration device capable of supplying a measurement of turbidity of the effluent, a turbidity probe positioned downstream of the first outlet of the primary filtration device capable of supplying a measurement of turbidity of the first flow;
   an activation pump for the separation device; and
   a means for servocontrolling comprising a computer configured to control the activation pump of the separation device as a function of the measurement of the turbidity of the first flow and/or of a difference between the measurement of turbidity of the first flow and the measurement of turbidity of the effluent, so as to increase the recirculation to the inlet of the primary filtration device of the particles of a size greater than a predefined size or density,
   wherein the primary filtration device comprises a first filter having a mesh of a first diameter designed to retain on the first filter particles having a diameter greater than the first diameter, and
   wherein the first filter is configured so as to form, in combination with the particles retained on the first filter, a second filter having a porosity corresponding to a cut-off threshold less than the first diameter.

2. The treatment device as claimed in claim 1, wherein the separation device comprises a hydrocyclone.

3. The treatment device as claimed in claim 1, comprising a device for diluting the second flow positioned downstream of the second outlet of the primary filtration device.

4. The treatment device as claimed in claim 1, comprising a device for seeding the effluent, positioned upstream of the inlet of the primary filtration device and designed to seed particles of diameter greater than a previously defined second diameter.

5. The treatment device as claimed in claim 1, the means for servocontrolling being designed to calculate a treatment performance as a function of the measurement of turbidity of the first flow and the measurement of turbidity of the effluent, wherein the means for servocontrolling is configured to activate the activation pump when the treatment performance reaches a first predefined threshold value and to deactivate the activation pump when the treatment performance reaches a second predefined threshold value.

* * * * *

UNITED STATES PATENT AND TRADEMARK OFFICE
CERTIFICATE OF CORRECTION

PATENT NO. : 11,007,460 B2  
APPLICATION NO. : 16/338619  
DATED : May 18, 2021  
INVENTOR(S) : Bruno Domenjoud et al.

Page 1 of 1

It is certified that error appears in the above-identified patent and that said Letters Patent is hereby corrected as shown below:

In the Claims

In Claim 1, Column 12, Line 35, "onfigured to be directed" should be -- configured to be directed --.

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*